United States Patent
Nagata et al.

(10) Patent No.: US 9,447,737 B2
(45) Date of Patent: Sep. 20, 2016

(54) THROTTLE CABLE RETAINER

(71) Applicant: WALBRO ENGINE MANAGEMENT, L.L.C., Tucson, AZ (US)

(72) Inventors: Noriyu Nagata, Saikawa Shiroishi (JP); Hiroki Ogasawara, Shibata-Machi (JP); Yoshio Asano, Shibata-Machi (JP); Yoshiaki Douyama, Shibata-Machi (JP)

(73) Assignee: WALBRO LLC, Tucson, AZ (US)

( * ) Notice: Subject to any disclaimer, the term of this patent is extended or adjusted under 35 U.S.C. 154(b) by 85 days.

(21) Appl. No.: 14/301,361

(22) Filed: Jun. 11, 2014

(65) Prior Publication Data

US 2014/0366841 A1    Dec. 18, 2014

Related U.S. Application Data

(60) Provisional application No. 61/834,951, filed on Jun. 14, 2013.

(51) Int. Cl.
*F16K 31/46* (2006.01)
*F02D 9/10* (2006.01)

(52) U.S. Cl.
CPC ............. *F02D 9/107* (2013.01); *F16K 31/465* (2013.01)

(58) Field of Classification Search
CPC .... F02D 9/107; F02D 9/1065; F16K 31/465; F16K 31/46
USPC .......................................... 251/294; 123/403
See application file for complete search history.

(56) References Cited

U.S. PATENT DOCUMENTS

| | | | | |
|---|---|---|---|---|
| 5,207,116 A | * | 5/1993 | Sultze | F16C 1/14 403/104 |
| 5,295,408 A | * | 3/1994 | Nagle | F16C 1/105 74/501.5 R |
| 5,511,442 A | * | 4/1996 | Tame | F16C 1/14 74/502.6 |
| 5,584,212 A | * | 12/1996 | Wild | F16C 1/14 403/319 |
| 7,007,931 B2 | * | 3/2006 | Tobinai | F02M 9/085 261/44.6 |
| 7,287,741 B2 | | 10/2007 | Horikawa | |
| 7,497,419 B2 | | 3/2009 | Sonnenkalb | |
| 8,166,950 B2 | * | 5/2012 | Scheuerell | F02D 9/1065 123/337 |

FOREIGN PATENT DOCUMENTS

| | | |
|---|---|---|
| JP | S59-190945 | 12/1984 |
| JP | 62-160757 | 10/1987 |
| JP | 3-127049 | 12/1991 |
| JP | 3-127050 | 12/1991 |
| JP | 4-57642 | 5/1992 |
| JP | 6-34146 | 5/1994 |
| JP | 2000-027842 | 1/2000 |
| JP | 2002-339765 | 11/2002 |
| JP | 2007-239750 | 9/2007 |
| JP | 2010-236465 | 10/2010 |

* cited by examiner

*Primary Examiner* — John K Fristoe, Jr.
*Assistant Examiner* — Andrew J Rost
(74) *Attorney, Agent, or Firm* — Reising Ethington, P.C.

(57) ABSTRACT

In at least some implementations, an apparatus includes a throttle valve rotatable between an first position and a second position, a connection member coupled to the throttle valve and a wire retainer coupled to the connection member. The connection member is adapted to be coupled to a wire that controls rotation of the throttle valve, and the wire retainer is adapted to overlie the wire and inhibit unintended decoupling of the wire from the connection member.

20 Claims, 3 Drawing Sheets

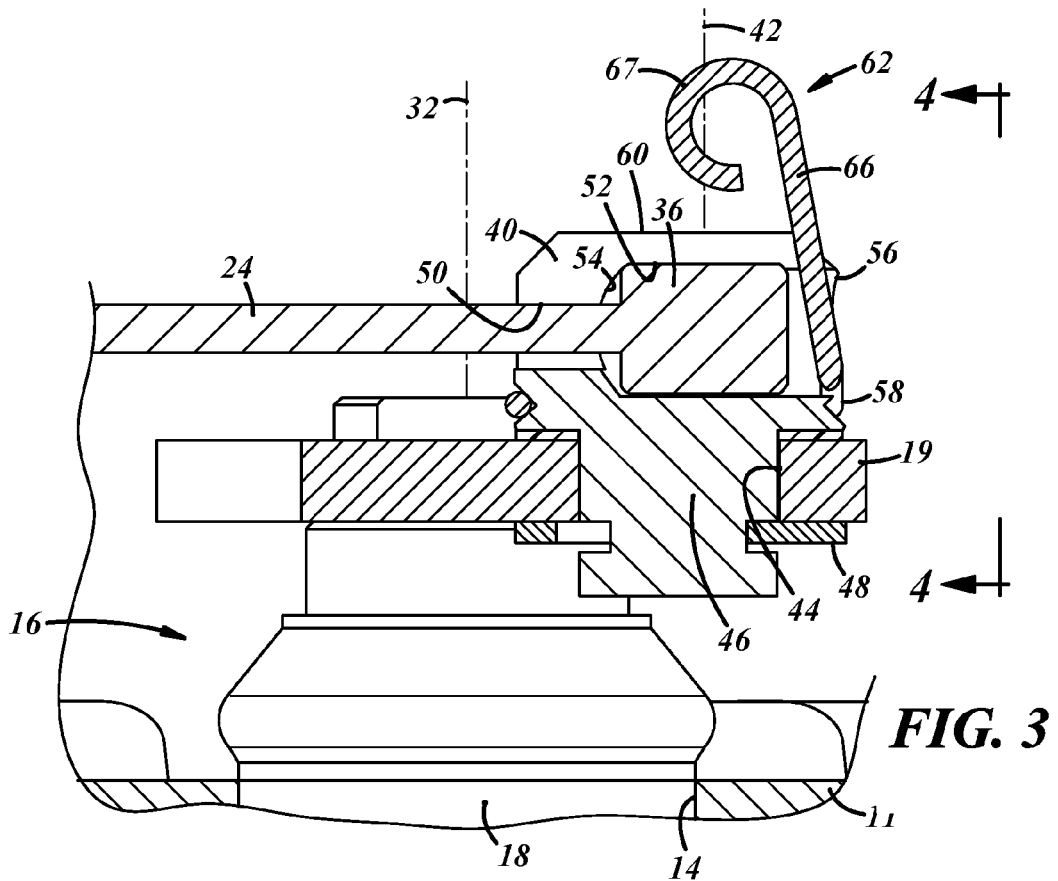
*FIG. 3*
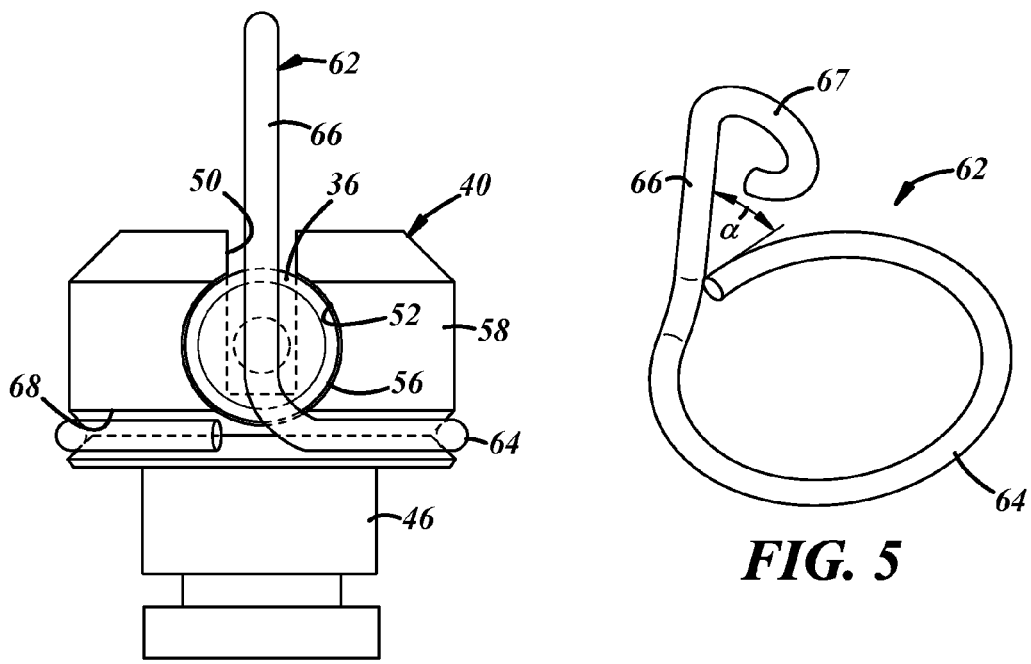
*FIG. 4*
*FIG. 5*

THROTTLE CABLE RETAINER

REFERENCE TO CO-PENDING APPLICATION

This application claims the benefit of U.S. Provisional Application No. 61/834,951 filed Jun. 14, 2013, which is incorporated herein by reference in its entirety.

TECHNICAL FIELD

The present disclosure relates generally to a device having a throttle valve actuated by a cable and a device to retain the cable coupled to the throttle valve.

BACKGROUND

Fuel systems for combustion engines can sometimes include a carburetor that delivers a combination of fuel and air to an engine to support operation of the engine. A throttle valve may be coupled to a user actuated lever or trigger so that the position of the throttle valve may be changed by the user to permit the user to alter the speed and/or power of the engine. A cable may interconnect the throttle valve and the user actuated lever or trigger.

SUMMARY

In at least some implementations, an apparatus includes a throttle valve rotatable between an first position and a second position, a connection member coupled to the throttle valve and a wire retainer coupled to the connection member. The connection member is adapted to be coupled to a wire that controls rotation of the throttle valve, and the wire retainer is adapted to overlie the wire and inhibit unintended decoupling of the wire from the connection member.

In at least some implementations, an apparatus for a device having a rotatable throttle valve includes a connection member and a wire retainer. The connection member may be adapted to be coupled to the throttle valve and to a wire that provides a force to rotate the throttle valve. The wire retainer member may be coupled to the connection member and adapted to overlie a portion of the wire to inhibit unintended decoupling of the wire from the connection member. This may be useful, in the example of a carburetor, to maintain a throttle cable coupled to the throttle valve throughout the life of the device.

In at least some implementations, a retainer is provided for a swivel coupled to a throttle valve lever, where the swivel includes a slot in which a throttle wire is received. The retainer may include a base adapted to be carried by the swivel, and an arm extending from the base to overlie at least a portion of the slot to retain a throttle wire within the slot.

BRIEF DESCRIPTION OF THE DRAWINGS

The following detailed description of preferred embodiments and best mode will be set forth with reference to the accompanying drawings, in which:

FIG. 3 is an enlarged, fragmentary sectional view taken generally along the line 3-3 in FIG. 2;

FIG. 4 is an end view of a swivel and clip for a throttle valve lever;

FIG. 5 is a perspective view of a clip like that shown in FIG. 4;

DETAILED DESCRIPTION OF PREFERRED EMBODIMENTS

Figure 1:
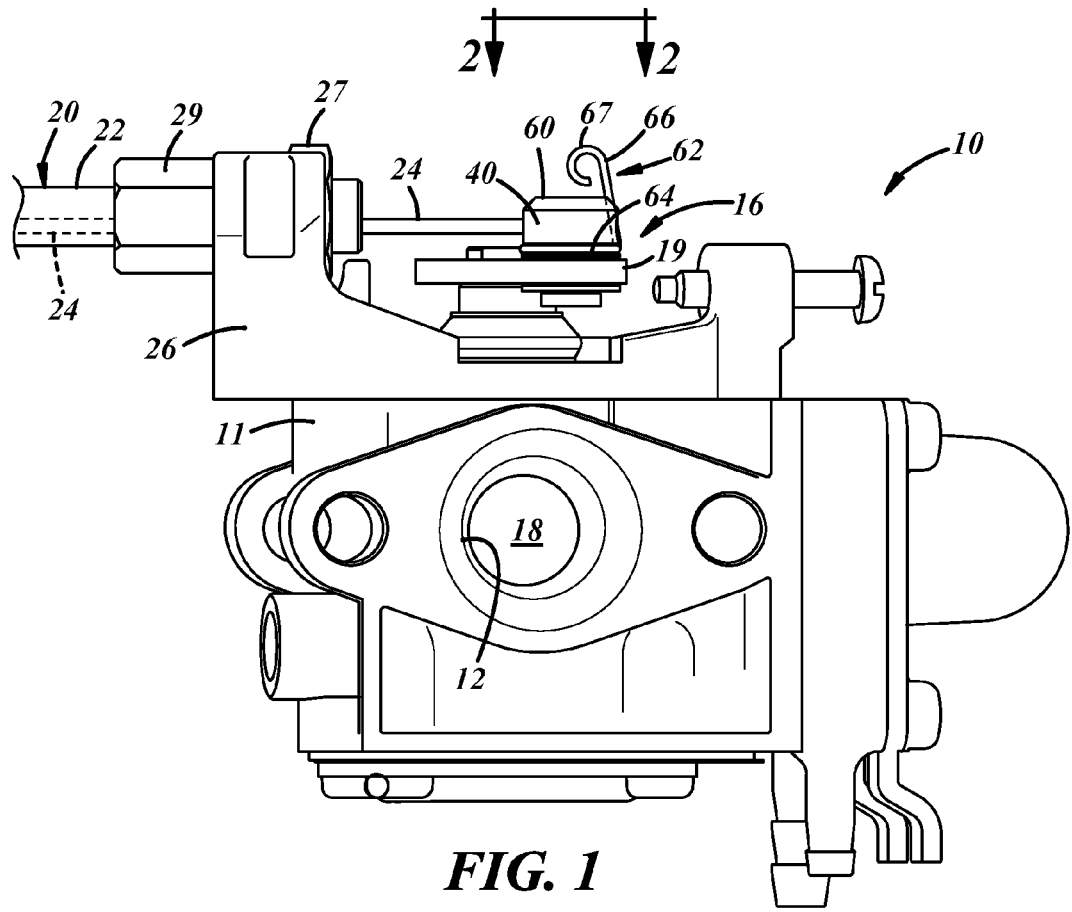
FIG. 1 is a side view of a carburetor illustrating a throttle control cable and throttle valve lever coupled to a throttle valve.

Referring in more detail to the drawings, FIG. 1 illustrates a rotary throttle valve carburetor 10 that includes a carburetor main body 11 provided with a fuel and air mixing passage 12. Air enters the mixing passage 12 at one end, is mixed with fuel, and a fuel and air mixture flows out of an outlet end of the mixing passage 12 for delivery to an engine. The main body 11 also includes a valve bore 14 (FIG. 3) extending perpendicular to and communicated with the mixing passage 12. A rotary throttle valve 16 is placed in the valve bore 14 and includes an intake or valve passage therethrough that is variably aligned or registered with the mixing passage 12 to selectively open and close the same. While the description herein relates to a rotary throttle valve carburetor 10 as shown in the drawings, the disclosure may also be applied to other devices having a throttle valve actuated by a wire or cable, for example, a throttle body having a throttle valve that controls airflow through the throttle body, as well as other types of carburetors.

In the implementation shown, the throttle valve 16 includes a throttle valve body 18 rotatably received in the valve bore 14 for movement between an idle position and a fully or wide open position with respect to the mixing passage 12 in accordance with the angular position of the throttle valve body 18. At least a portion of the valve body 18 extends out of the carburetor main body 11 and is connected to a throttle valve lever 19 such as by, for example, a rivet 31 or other fastener, weld, adhesive, friction fit, or the like. The throttle valve lever 19 is connected to an end of a throttle control cable 20 which may be a bowden type cable having an outer sheath 22 and an inner wire 24 that is slidably moveable within and relative to the sheath 22. The sheath 22 and wire 24 may be formed of any suitable materials. A cable retainer 26 for fixedly retaining the sheath 22 of the throttle cable 20 is provided on the carburetor main body 11.

To yieldably rotatably bias the throttle valve 16 toward its idle position a biasing member, such as a torsion coil spring, is positioned between the throttle valve lever 19 and carburetor main body 11 and may be coaxially wound around the throttle body 18. In use, the throttle valve lever 19 connected to the throttle cable 20 is angularly moved so that the throttle valve 16 rotates about its axis 32 to open and close the mixing passage 12. In this implementation, absent a force provided by the control cable to move the throttle valve 16 toward its wide open position, the throttle valve 16 will tend to rotate to its idle position under the force of the spring biasing member.

Figure 2:
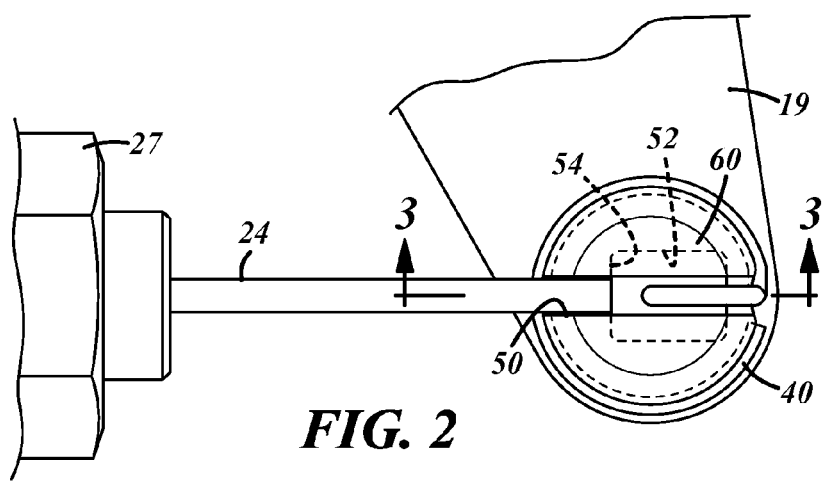
FIG. 2 is an enlarged, fragmentary plan view taken in the direction of the arrows 2-2 in FIG. 1.

As shown in FIGS. 1-3, the throttle valve lever 19 is connected to an end of the throttle cable 20, specifically the inner wire 24 while the outer sheath is coupled to the carburetor body 11 at cable retainer 26. A retention feature may be provided on the wire portion extending out of the sheath 22 to facilitate coupling the wire 24 to the throttle valve lever 19. The retention feature may be any suitable member and is shown as an enlarged and generally cylindrical end fitting 36 that may be crimped, soldered or otherwise connected to the wire 24.

The cable retainer 26 may include a threaded portion 27 and an adjustment nut 29 serving as a lock nut threads onto part of the threaded portion 27 so that the position of the retained end of the outer sheath 22 may be adjusted with respect to the cable retainer 26.

As noted earlier, the inner wire 24 extends out of the sheath 22, beyond the cable retainer 26 and is coupled to the throttle valve lever 19 to control actuation of the throttle valve 16. In the implementation shown, the throttle valve lever 19 includes a wire connection member by which the wire is coupled to the throttle valve lever. The connection member as shown includes a swivel 40 carried by the throttle valve lever 19 for rotation about an axis 42 relative to the throttle valve lever 19 to permit the wire 24 to stay generally aligned with the sheath 22. The swivel 40 is located spaced from the axis of rotation 32 of the throttle valve 16 so that it swings an arc about the axis 32 as the throttle valve 16 rotates. An opening 44 through the lever 19 may receive a post 46 of the swivel 40 and a clip 48, weld, fastener, adhesive or any other suitable member or feature may retain the swivel 40 on the lever 19. In the implementation shown, the swivel 40 is releasably or removably coupled to the lever 19 such that the swivel 40 can be removed from the lever 19 without damaging the lever. This may facilitate retrofitting an existing throttle valve lever 19 with a swivel 40 constructed as set forth herein.

As shown in FIGS. 2 and 3 the swivel 40 includes a connection feature to retain the wire 24. The connection feature in the implementation shown is a slot 50 that may have an enlarged portion 52 adapted to receive the wire end fitting 36 and provide a shoulder 54 against which the end fitting 36 bears so that a pulling force of the wire 24 is transmitted to the swivel 40 to rotate the throttle valve 16. The enlarged portion 52 may be open at one end 56 to a peripheral sidewall 58 or edge of the swivel 40 and extend radially inwardly of the swivel 40 an amount greater than the length of the end fitting 36. The enlarged portion 52 may be spaced from an upper surface 60 of the swivel 40 so that the end fitting 36 must be inserted into the slot 50 via the open peripheral end 56. That is, in this implementation, the slot 50 at the upper surface 60 of the swivel 40 is too small to fit the end fitting 36 therethrough, but large enough to receive the wire 24 therethrough. To maintain the wire 24 generally coaxially aligned with the outer sheath 22, the slot 50 may be arranged at the same axial height (relative to the axis 32 of throttle valve rotation) as the wire 24, as shown in FIG. 1. This may facilitate smooth actuation of the wire 24 and throttle valve 16.

To help retain the wire 24 within the slot 50 and coupled to the swivel 40, a wire retainer may be provided that overlies at least a portion of the slot 50 and the wire 24 within the slot 50. In the implementation shown, the wire retainer includes a clip 62 that includes a base 64 that is coupled to the swivel 40 and an arm 66 extending from the base 64. The clip 62 may be formed from a metal or plastic material and the base 64 and arm 66 may be formed from the same piece of material or from different pieces of material that are joined together. In the embodiment shown, the base 64 includes a generally circular loop of material that is fitted around the peripheral sidewall 58 of the swivel 40, such as within a radially inwardly extending groove 68 formed in the sidewall 58 of the swivel 40 (see e.g. FIGS. 3 and 4). In the implementation shown, the arm 66 is provided at an acute included angle α (FIG. 5) relative to the base 64 and, in assembly, overlies at least part of the peripheral end 56 of the enlarged portion 52 of the slot 50 to block the end 56 of the slot 50 to prevent the wire end fitting 36 from backing out of the slot 50 and thereby decoupling the wire 24 from the swivel 40. It has been found that the wire 24 may tend to move relative to and decouple from the swivel 40 when the rate of return of the throttle valve 16 back toward its idle position (caused by the return spring) is greater than the rate at which the wire 24 moves within its sheath 22 in a given instance. With the clip 62 in place, the relative movement between the end fitting 36 and the swivel 40 is limited or prevented.

In a typical application, the throttle wire 24 is not coupled to the swivel 40 until after the carburetor 10 is mounted to an engine. When so mounted, access to the throttle valve lever 19 and swivel 40 may be limited by adjacent components or structures, making installation of the clip 62 or other wire retaining feature difficult. To overcome this, the clip 62 may be installed on the swivel 40 before the wire 24 is coupled to the swivel 40, and before the carburetor 10 is mounted on an engine. Further, if desired, in at least some embodiments the clip 62 may be rotated or otherwise moveable relative to the swivel 40 to facilitate insertion of the wire end fitting 36 into the slot 50 and thereafter positioning the clip 62 so that it overlies a portion of the slot 50 and end fitting 36. The arm may include a bent free end 67 that may be provided to increase an area of engagement for rotating the clip, to avoid an upwardly or outwardly projecting straight and sharp end of the arm 66, facilitate handling and assembly of the clip 62 or for other reason(s).

In one form, the clip 62 may initially be positioned relative to the swivel 40 such that the arm 66 does not block the peripheral end 56 of the slot 50. After the wire 24 is installed in the slot 50, the clip 62 may be rotated relative to the swivel 40 until the arm 66 overlies or blocks at least part of the peripheral end 56 of the slot 50. Rotation of the clip 62 may be accomplished by pushing or pulling on the arm 66 (and/or base) until the arm 66 is registered or aligned with the slot 50. The arm 66 may be resiliently flexed against the swivel 40 when the arm 66 is not aligned with the slot 50 and unflexed or flexed less when aligned with the slot 50 so that the arm 66 flexes radially inwardly into the slot 50 when aligned therewith. This may facilitate retaining the arm 66 aligned with the slot 50 in use, regardless of vibrations or other forces that may tend to rotate the clip 62 relative to the swivel 40.

Figure 6:
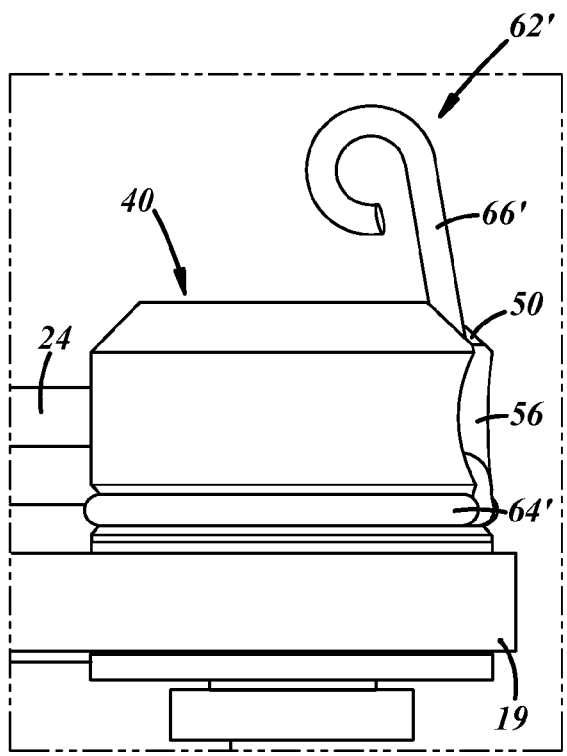
FIG. 6 is a fragmentary perspective view of a swivel and a clip.
Figure 7:
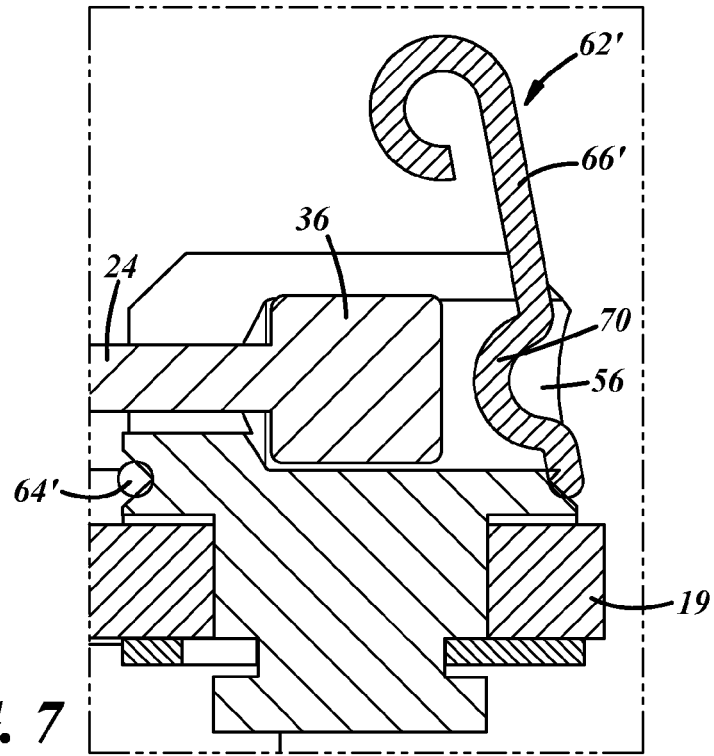
FIG. 7 is a fragmentary sectional view of the swivel and clip shown in FIG. 6.

As shown in FIGS. 6 and 7, a clip 62' may include an arm 66' having a stop surface or catch 70 arranged to more definitely extend into the slot 50, especially the open end 56 of the slot. In the example shown, the catch 70 is defined by an inwardly bent portion of the arm 66'. When the arm 66' is aligned with the slot 50, the catch 70 extends inwardly of the open end 56 so that the catch is overlapped by the swivel at either edge of the slot 50. This more securely retains the clip in position relative to the slot and prevents vibration or other forces from unintentionally removing the clip from the slot in use. The increased overlap or extent to which the clip is received within the slot may also make installation of the clip easier as an operator can more readily tell when the arm is aligned with the slot and a tendency to rotate the arm past the slot will be inhibited or prevented. While shown as a simple bend in the arm 66', the catch could be formed in any suitable manner and may be an integral portion of the arm 66' (i.e. a feature formed from/on/in the same piece of material as the rest of the arm) or a separate component carried by the arm 66' or base 64' of the clip.

While described as having a base 64, 64' and arm 66, 66', the wire retaining feature may include any member that inhibits or prevent unintended withdrawal of the wire 24 from the swivel 40. Further, while described as being rotatable or otherwise moveable relative to the swivel 40 from an assembly position to a final position, the wire retaining feature need not be so constructed, and could instead be installed after the throttle wire 24 is coupled to the swivel 40 rather than before. Further, instead of being rotatable about the swivel 40, the arm 66, 66' may pivot or otherwise move outwardly away from the slot 50 to allow the end fitting 36 to be received within the slot 50 and then be pivoted or moved to a position at least partially blocking the slot 50. That position may be maintained by a snap or interference fit between the base 64, 64' and the arm 66, 66' of the clip 62, or a portion of the swivel 40, as desired.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. An apparatus, comprising:
   a throttle valve rotatable about an axis between a first position and a second position;
   a wire with an end and an enlarged fitting attached to the wire adjacent the end of the wire for connecting the wire to the throttle valve;
   a connector body coupled to the throttle valve at a location spaced from the axis of rotation, the body having a peripheral sidewall and an end, a slot opening through the sidewall and the end and having a first portion configured to receive the wire therein and an enlarged second portion with a shoulder and configured to receive the enlarged fitting therein to be engagable with the shoulder; and
   a clip carried by the connector body and at least partially overlapping the enlarged fitting and retaining the enlarged fitting in the enlarged portion of the slot.

2. The apparatus of claim 1 wherein the connector body includes a swivel coupled to a lever that is connected to the throttle valve and the clip comprises a wire retainer coupled to the body.

3. The apparatus of claim 1 wherein the clip is moveable relative to the connector body from a first position wherein the clip permits coupling of the wire to the body and a second position wherein the clip inhibits or prevents decoupling of the wire from the body.

4. The apparatus of claim 3 wherein the clip includes a base coupled to the body and an arm extending from the base to overlie at least a portion of the enlarged fitting when the clip is in its second position.

5. The apparatus of claim 1 wherein the enlarged second portion has an opening to the peripheral sidewall of the body to permit the enlarged fitting to be received in the enlarged second portion.

6. The apparatus of claim 5 wherein the enlarged second portion is arranged so that the enlarged fitting cannot be removed from the body other than through the peripheral sidewall.

7. The apparatus of claim 6 wherein the clip overlaps a portion of the opening to the peripheral sidewall.

8. The apparatus of claim 5 wherein when the clip overlaps the enlarged fitting the clip is in part received in the enlarged second portion.

9. An apparatus for a device having a throttle valve rotatable about an axis between a first position and a second position, comprising:
   a wire with an end and an enlarged fitting attached to the wire adjacent the end of the wire for connecting the wire to the throttle valve;
   a connector body coupled to the throttle valve at a location spaced from the axis of rotation, the body having a peripheral sidewall and an end, a slot opening through the sidewall and the end and having a first portion configured to receive the wire therein and an enlarged second portion with a shoulder and configured to receive the enlarged fitting therein to be engagable with the shoulder; and
   a clip carried by the connector body and at least partially overlapping the enlarged fitting and retaining the enlarged fitting in the enlarged portion of the slot to inhibit unintended decoupling of the wire from the connector body.

10. The apparatus of claim 9 wherein the connector body includes a swivel coupled to a lever that is connected to the throttle valve and the clip comprises a wire retainer coupled to the body.

11. The apparatus of claim 9 wherein the clip is moveable relative to the connector body from a first position wherein the clip permits coupling of the wire to the body and a second position wherein the clip inhibits or prevents decoupling of the wire from the body.

12. The apparatus of claim 11 wherein the clip includes a base coupled to the body and an arm extending from the base to overlie at least a portion of the enlarged fitting when the clip is in its second position.

13. The apparatus of claim 9 wherein the enlarged second portion has an opening to the peripheral sidewall to permit the enlarged fitting to be received in the enlarged second portion.

14. The apparatus of claim 13 wherein the enlarged second portion is arranged so that the enlarged fitting cannot be removed from the body other than through the opening.

15. The apparatus of claim 9 wherein the clip comprises a base carried by the body and an arm which includes a stop surface that extends into the enlarged second portion.

16. The apparatus of claim 9 wherein the clip comprises:
    a base carried by the connector body; and
    an arm extending from the base to overlie at least a portion of the slot to retain the wire within the slot.

17. The apparatus of claim 16 wherein the base is moveable relative to the body to permit the arm to be spaced from said portion of the slot in one position and to overlie said portion of the slot in another position.

18. The apparatus of claim 17 wherein the arm is resilient and may flex outwardly when engaged with the body outside of the slot and may return toward its unflexed position when aligned with the slot.

19. The apparatus of claim 16 wherein the arm extends at an acute included angle relative to the base.

20. The apparatus of claim 9 wherein the connector body has a circumferentially continuous groove opening onto the peripheral sidewall and the clip comprises a resilient wire having an annular base rotatably received in the groove and an arm extending from the base and the clip being rotatable relative to the body to dispose at least part of the arm to overlap at least part of the enlarged fitting.

* * * * *